(12) United States Patent
Buckley et al.

(10) Patent No.: US 7,075,431 B2
(45) Date of Patent: Jul. 11, 2006

(54) LOGICAL PET IMMUNE INTRUSION DETECTION APPARATUS AND METHOD

(75) Inventors: Mark C. Buckley, Shingle Springs, CA (US); Kevin M. Pelletier, Rocklin, CA (US); Mark A. Von Striver, Folsom, CA (US)

(73) Assignee: Honeywell International Inc., Morristown, NJ (US)

( * ) Notice: Subject to any disclaimer, the term of this patent is extended or adjusted under 35 U.S.C. 154(b) by 94 days.

(21) Appl. No.: 10/719,816

(22) Filed: Nov. 21, 2003

(65) Prior Publication Data
US 2005/0040947 A1 Feb. 24, 2005

Related U.S. Application Data

(60) Provisional application No. 60/496,254, filed on Aug. 18, 2003.

(51) Int. Cl.
*G08B 13/08* (2006.01)

(52) U.S. Cl. .................. 340/545.3; 340/567; 340/541; 250/342; 250/DIG. 1

(58) Field of Classification Search ............ 340/545.3, 340/573.1, 567, 541, 555; 250/342, 352, 250/DIG. 1
See application file for complete search history.

(56) References Cited

U.S. PATENT DOCUMENTS

| | | | |
|---|---|---|---|
| 3,988,726 A * | 10/1976 | Reiss et al. | 340/567 |
| 4,618,854 A * | 10/1986 | Miyake et al. | 340/567 |
| 4,841,284 A | 6/1989 | Biersdorff | |
| 4,849,635 A | 7/1989 | Sugimoto | |
| 5,101,194 A * | 3/1992 | Sheffer | 340/567 |
| 5,196,826 A | 3/1993 | Whiting | |
| 5,461,231 A | 10/1995 | Sugimoto | |
| 5,473,311 A | 12/1995 | Hoseit | |
| 5,557,106 A | 9/1996 | Ioco | |
| 5,670,943 A | 9/1997 | DiPoala et al. | |
| 5,703,368 A | 12/1997 | Tomooka et al. | |
| 5,844,487 A | 12/1998 | Britt | |
| 5,903,217 A | 5/1999 | Stanczak et al. | |
| 5,923,250 A | 7/1999 | Pildner et al. | |
| 6,188,318 B1 * | 2/2001 | Katz et al. | 340/545.3 |
| 6,211,522 B1 | 4/2001 | Kotlicki et al. | |
| 6,215,399 B1 | 4/2001 | Shpater | |
| 6,265,972 B1 | 7/2001 | Lee | |

* cited by examiner

*Primary Examiner*—Anh V. La
(74) *Attorney, Agent, or Firm*—John P. O'Banion

(57) ABSTRACT

A system and method of discerning human intrusion from animal presence without compromising sensitivity to human intruders exhibiting low intensity infrared signatures. At least four infrared sensing elements are arranged with at least one horizontal pair and at least one vertical pair, such as within a quad-sensing element device. To generate an intrusion alert in a pet-immune mode, simultaneous changes in infrared energy must be registered in at least two vertically adjacent detection zones spanning two tiers of sensing elements, corresponding to detecting a standing or semi-standing human intruder. Intrusion is generated in a non-pet-immune detection mode in response to registering sufficient infrared activity within any one or more individual detection zones. The focal lengths of the lens elements and position of the lens tiers are configured to produce a vertical separation of detection tiers sufficient to prevent a pet from simultaneously occupying space in two vertically adjacent detection zones.

45 Claims, 11 Drawing Sheets

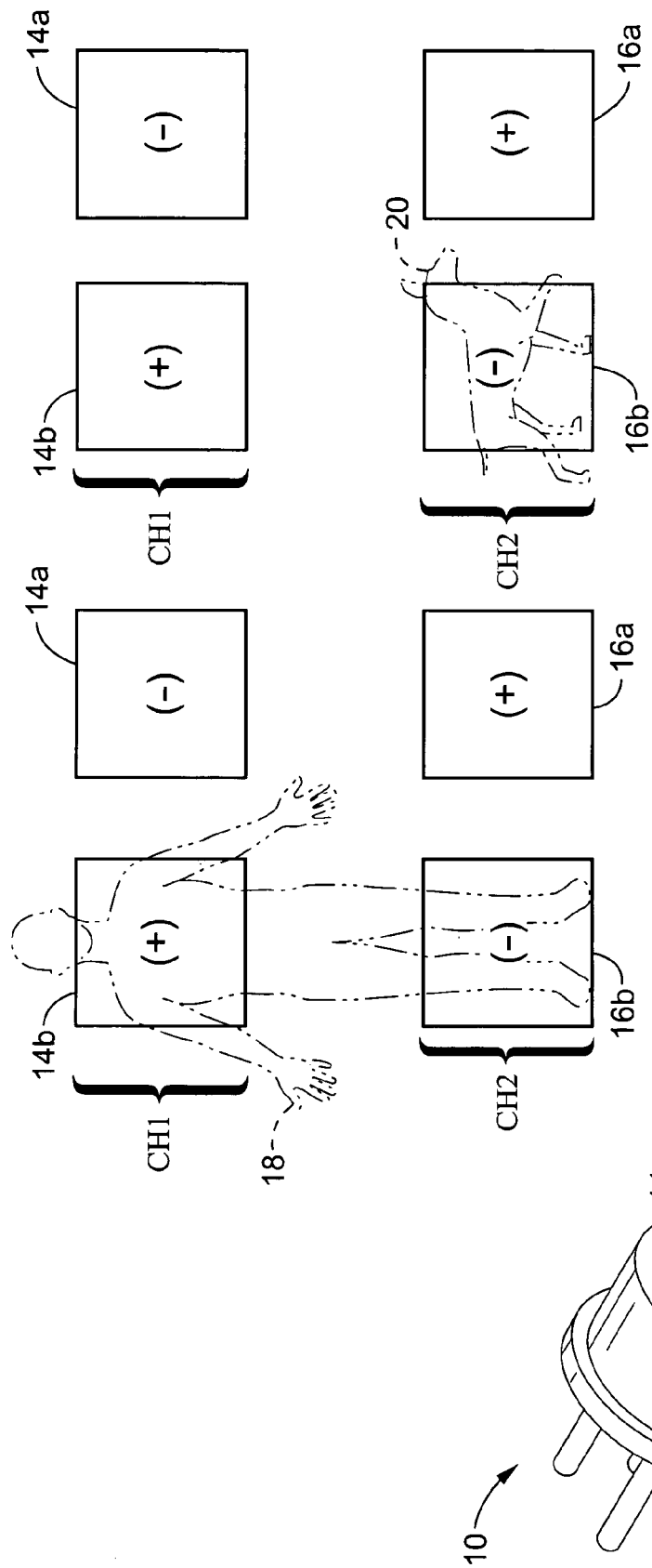

LOGICAL PET IMMUNE INTRUSION DETECTION APPARATUS AND METHOD

CROSS-REFERENCE TO RELATED APPLICATIONS

This application claims priority from U.S. provisional application Ser. No. 60/496,254 filed on Aug. 18, 2003, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to optical motion detectors used in alarm systems, and more particularly to a passive infrared (PIR) intruder detection system capable of ignoring pet intrusions without compromising human intrusion detection sensitivity.

2. Description of Related Art

Security systems typically utilize infrared motion sensing devices, such as passive infrared detectors, for registering the presence of unauthorized personnel intruding within a protected region. Optics, typically comprising an array of lens elements or an array of segmented mirrors, focus infrared energy from the protected region onto a sensor. A typical sensor contains two infrared sensing elements. An array of segmented mirrors or an array of lens elements is used to produce multiple fields of view, also known as detection zones. The geometric relationship between a sensing element and a lens element defines a detection zone, a volume which emanates from the detector.

The geometry of each detection zone can be defined by projecting each sensing element through the optical center of each lens element and bounded as the detection zone intersects the floor or attains a length equal to the manufacturers advertised range. The array of resulting detection zones defines the detection pattern. The protected region is the envelope of the detection pattern as truncated by the walls of the room containing the detector. Registering a sufficient level of infrared energy or change in infrared energy with respect to time (motion) in any detection zone will cause the system to generate an intrusion signal. One common type of sensor is a pyroelectric infrared sensor designed for registering a change in radiation intensity within the infrared spectrum.

A number of security applications exist where the conventional detection field geometry is not suitable to the application. One problem encountered in security applications is discriminating between human intruders and the motion of pets or other small animals (i.e. dogs or cats) moving in, or through, the protected region. A number of intrusion detectors have incorporated features in an attempt to discern between these two forms of thermally active objects. One problem with many of these detectors is that they attempt to discriminate between human and animal intrusions based on the intensity of the infrared (heat) signature. To prevent false alarms caused by pets, these intrusion detector mechanisms generally require reducing their sensitivity by a significant factor.

It has been found in testing, however, that a human heat signature in some cases can have a lower intensity than that of a small animal, such as a dog. Many average size dogs, especially those having a high thermal signature such as short-haired dogs and those with a high metabolism, will exceed the infrared threshold. Increasing the infrared threshold level is not a valid option as it was also found that an individual with a low thermal signature, such as a person of small stature, wearing thick clothing, or having a large amount of body fat, could provide a thermal signature less than that of many dogs, wherein the human intruder would go undetected.

Consequently, these intensity-based approaches to discerning human intrusion from animal motions are still subject to generating false alarms, while the sensitivity reductions intended to prevent false alarms from small pets can allow human intruders with a small thermal signature to pass undetected.

One example of an existing system utilizes vertically-stacked lens elements within a lens array to enlarge the vertical image zone in an attempt to collect more of the infrared radiation of an upright object (human) versus a "shorter" dog. It is presumed that signals being received from a pet such as a dog will not cross the signal threshold, while the infrared radiation intensity from a human is expected to exceed the threshold and generate an output signal.

Another technique registers intrusion in response to information collected as an object traverses multiple zones of a multiple element pyroelectric infrared sensor grid. This method requires a significant distance to operate and is not amenable for use when the object moves directly toward the sensor.

One technique for discriminating humans from pets is to increase the sensitivity of the upper detection zones. This is accomplished by increasing the area of the upper lens elements. This approach assumes that pets will not be able to enter these upper detection zones. Since these detection zones are angled below horizontal, they will detect a pet at a distance. If the room is of sufficient size these detection zones can drop down to the height of the pet making the detector subject to false triggering by pets. Since the short range detection zones are made less sensitive to preclude an alarm caused by a pet, these detectors are subject to non-detections of human intruders, such as those that are heavily clothed, or that otherwise present a small heat signature.

Attempts have also been made to combine other forms of sensors with the PIR detector to discern pet motions from human intrusions. One example is an active microwave system utilized in combination with a PIR detector. This form of intrusion detection system requires complex signal processing on the inputs to evaluate the results. Initial costs as well as set-up costs are high for such an approach.

Another form of common approach for distinguishing pet intrusion from human intrusion is that of utilizing multiple sensors with multiple lenses within a single housing. In one example, a first pyroelectric infrared sensor and lens array is mounted at shoulder height with detection zones receiving infrared energy over a substantially horizontally oriented detection band. A second pyroelectric infrared sensor and lens array is retained below the first sensor and lens array producing a second horizontal band of detection zones located directly below the first band. Activity on both sensors is required to trigger an alarm, presuming again a standing individual.

A disadvantage of mounting a sensor at shoulder height is that it can be easily damaged or blocked. In similar approaches using two sensors and two lens arrays, a series of horizontal bands of detection zones is produced in which the bands produced by one sensor/lens arrangement is interlaced vertically with those of the other sensor/lens arrangement. Since prior art which utilizes this technique uses the same focal length for all lens elements, the upper bands of detection zones for each sensor/lens arrangement overlap and create a false alarm issue for long range detection. Consequently, this technique is similarly prone to false triggering as prior attempts at a solution.

FIG. 1 illustrates a conventional dual-element pyroelectric infrared sensor having one positive and one negative sensed element. These sensors may be utilized in a conventional intrusion detection device which is configured for detecting infrared energy changes which arise in the field of view of the detection device.

FIG. 2 illustrates a twenty four (24) element lens array shown with the lens elements arranged to produce four tiers of lens elements. When this lens array is combined with a two element pyroelectric infrared sensor shown in figure one, 48 detection zones are produced, one positive and one negative zone for each lens element. The tiers of lenses are configured in an attempt to discriminate humans from pets, however, the intensity of infrared radiation from a short-haired animal, or one with a high metabolic rate, or other similar situation can approximate or exceed that of a human. Furthermore, a human intrusion may not be registered by such a sensor if the person is short, overweight, has a low metabolism, is wearing thick clothing or otherwise exhibits a low infrared radiation signature. In many designs, the horizontal bands of detection zones overlap one another in the vertical direction.

FIG. 3 and FIG. 4 show a comparison of human detection (FIG. 3) in relation to detection of a dog (FIG. 4) with regard to how the detection zones produced by the lens of FIG. 2 detects an intruder. The conventional system anticipates that infrared energy from a tall object will be received over more tiers of lenses thereby increasing the sum of infrared energy that is focused on the sensing elements and the chance of crossing the infrared detection threshold. The lenses corresponding to the diagram are marked in FIG. 2 as lenses A, B, C, D. It will be noted however, that a significant infrared source can trigger an intrusion alert regardless of whether it occurs in one or more vertically aligned zones.

In the above techniques, when pet-immune detection is selected, a compromise is required between sufficient sensitivity for detecting human intruders and the necessity of ignoring the motion of pets. These methods rely on the use of interchangeable sensors or lenses for desensitizing the security system for use in an environment that may include small animals, such as pets. This requires additional cost, setup expense, experienced installation personnel, and can lead to additional overall maintenance costs.

Therefore, a need exists for an intrusion detection apparatus that is able to reliably ignore the motions of small animals while accurately detecting intrusions by humans, and which may be configured for pet and non-pet detect situations without the need to change hardware. The present invention satisfies those needs, as well as others, and overcomes deficiencies in previously developed solutions.

BRIEF SUMMARY OF THE INVENTION

The present invention is a system and method for detecting human intrusions while ignoring the motion of small animals, such as dogs and cats, when operating in a pet-immune mode. The invention solves at least two problems with conventional detection mechanisms. According to an aspect of the present invention, humans are not distinguished from pets solely based on the infrared intensity, or changes thereto, as detected on a single sensing element. Therefore, the detector is not subject to false alarms generated by large dogs, short-hair animals, and/or animals with high metabolic rates. Intrusion detection according to the present invention can ignore pet intrusions without compromising the ability to detect intrusions by a human generating a low intensity heat signature. In addition, the inventive embodiments can be implemented without the need to change hardware, such as sensors or lenses, when installing the system in a given operating environment.

The system is implemented with non-overlapping detection zones wherein the presence of humans is detected in response to simultaneous energy being collected from two vertically adjacent detection zones and registered onto two vertically adjacent infrared sensing elements (i.e. different channels of dual-channel pyroelectric infrared sensor), and wherein humans are differentiated from animals in a pet-immune mode because an animal can span only a single detection zone, regardless of its thermal intensity.

By way of example and not of limitation, in one embodiment the infrared sensor comprises four pyroelectric infrared sensing elements arranged as a two-by-two array. The upper element pair are configured to produce an electrical signal in response to a change in infrared radiation intensity on one output channel while the lower element pair are configured to produce an electrical signal in response to a change in infrared radiation intensity on another output channel. Sensing elements are spatially configured so that the presence of a human is detected as simultaneous activity on both horizontal rows of infrared sensing elements. Humans are detected when an infrared sensing element from each channel produces a signal that exceeds a detection threshold. A small animal, by contrast, is only registered in one of the four quadrants and does not thereby exceed the intrusion detection threshold for both channels required when the detector is in a pet-immune mode.

A selector may be activated to configure the unit for operation in a pet free (small animal free) environment, wherein intrusion detection occurs when the intrusion signal threshold from any of the four quadrants is exceeded.

The following descriptions refer to sensing infrared intensity levels with regard to determining if an intrusion is occurring. It should be appreciated that these infrared intensity levels can be associated with absolute intensity thresholds, or more preferably a threshold based on the intensity change per unit of time which prevents steady state ambient conditions from triggering or contributing to trigger conditions.

In one embodiment, an apparatus for detecting intrusions within a protected region according to the present invention comprises (a) an infrared sensor assembly having at least four infrared sensing elements; (b) means for focusing infrared energy (such as a mirror assembly or lens assembly) from substantially non-overlapping detection zones (at least four or more) upon the infrared sensing elements (at least four infrared sensing elements are required, although more rows or columns may be utilized); and (c) means for generating an intrusion signal in response to the simultaneous registration of sufficient activity detected on a vertically-oriented pair of infrared sensing elements.

The means for focusing infrared energy operates by altering energy transmission, such as through a lens assembly, or by reflecting infrared energy, such as off of a mirror assembly.

The infrared sensors preferably comprise pyroelectric infrared sensors. Common mode noise is preferably rejected by attenuating signals simultaneously registered on horizontally adjacent detection zones, thereby preventing false alarms in response to ambient lighting changes, thermal disturbances in response to wind and power line effects, and other non-intrusion events.

The intrusion detector is preferably configured for allowing the user/installer to switch between a pet-immune mode and a non-pet-immune mode without the need to change parts within the system, such as lenses or sensors. When operating in the pet-immune mode, the registration of sufficient levels of infrared energy on each sensing element of a vertically-oriented pair of sensing elements discerns animal motions, registered by any single infrared sensing element, from human intrusions which are registered as simultaneous signals on two infrared sensing elements arranged vertically.

The means for generating an intrusion signal in response to the registration of sufficient infrared activity (intensity level change with respect to time) received simultaneously on a vertical pair of sensing elements is preferably implemented by evaluating at least two channels of sensing elements, with one stacked over the other. Each sensor channel may comprise separate sensing elements, or more preferably a dual-sensing element having two elements coupled in opposing polarity to reduce the effects of common-mode signals. Two dual-sensing element pairs are preferably retained proximal to one another, or in the same housing, with a lens that focuses infrared energy from non-overlapping detection zones onto each of the sensing elements.

A threshold circuit is connected to the two channels of sensing elements, upper and lower, and configured to generate an alarm in response to sufficient infrared activity detected in both upper and lower sensing element rows (i.e. upper and lower dual-sensing element pairs).

In another embodiment, an intrusion detector according to the present invention comprises (a) an infrared sensor assembly having at least four infrared sensing elements; (b) an optical assembly (i.e. lens or mirror based) configured to focus infrared energy collected from at least four non-overlapping detection zones upon the (at least four) infrared sensing elements; and (c) a threshold circuit configured to generate an intrusion signal in response to receipt of a sufficient level of simultaneous infrared activity on a vertically-oriented pair of the infrared sensing elements.

The invention also pertains to methods for discriminating human intrusion from animal intrusion within one or more detection zones. In one embodiment, the method generally comprises (a) registering infrared activity in at least two vertically adjacent detection zones; (b) rejecting common mode infrared signals simultaneously occurring in said horizontally adjacent detection zones; and (c) generating an intrusion signal within a pet-immune mode in response to the registration of sufficient levels of infrared activity simultaneously registered on the upper and lower rows of sensing elements. The intrusion signal therefore is generated in the pet-immune mode indicating a human intrusion in response to detecting simultaneous motion in both sensing element tiers, such as on vertically adjacent detection zones. Intrusion signals are not generated in the pet-immune mode in response to detected motion spanning a single detection zone.

According to an aspect of the inventive method, intrusion detection can further comprise determining if a non-pet-immune mode has been selected, such as through a switch selection means, wherein the intrusion signal is generated in response to sufficient levels of infrared activity registered on any one of the sensing elements.

The inventive system and method has been described by way of illustrative embodiments which may be modified in a number of ways without departing from the teachings of the invention. In addition, the present invention provides a number of beneficial aspects.

For example, one aspect of the invention provides accurate detection of human intrusion within an environment while not responding to the presence or motion of small animals, such as pets.

Another aspect of the invention is the ability to provide operation within environments subject to the movement of small animals without compromising human detection.

Another aspect of the invention is the ability to configure the system for pet-immune or non-pet-immune modes of detection without the necessity of changing system hardware, such as sensors and/or lenses.

Another aspect of the invention is the ability to select pet or non-pet operating modes with a single selector (i.e. switch).

A still further aspect of the invention is to provide a security sensor that provides common mode rejection horizontally while detecting human intrusions in response to activity detected in non-overlapping zones on multiple sensors spanning the vertical direction.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 5 is a perspective view of a quad-element pyroelectric infrared sensor according to an aspect of the present invention, and shown with apertures through which infrared energy is received in both horizontal and vertical directions.

FIG. 6 is a diagram of human detection utilizing the quad-element pyroelectric infrared sensor of FIG. 5 according to an aspect of the present invention.

FIG. 7 is a diagram of animal detection utilizing the quad-element pyroelectric infrared sensor of FIG. 5 according to an aspect of the present invention.

DETAILED DESCRIPTION OF THE INVENTION

Figure 2:
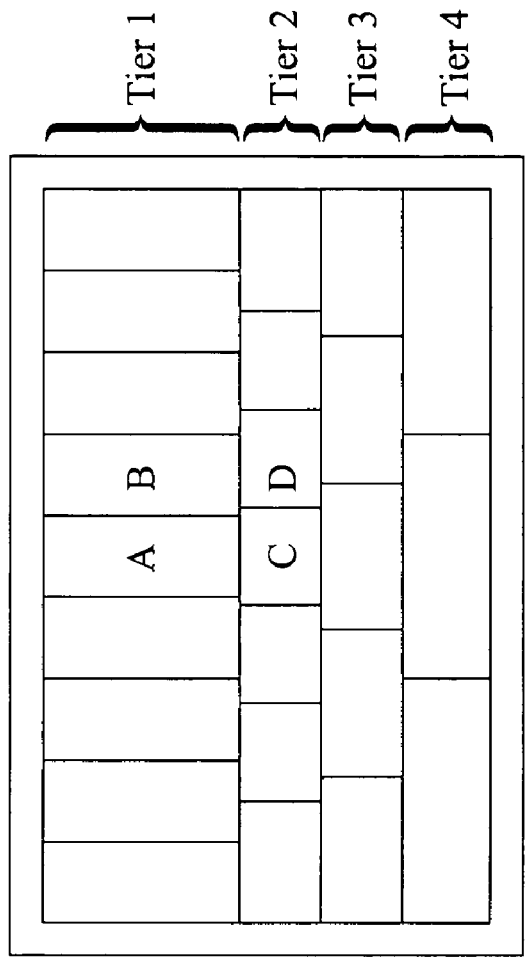
FIG. 2 is a front view of a conventional lens array such as conventionally utilized with a dual-element pyroelectric infrared sensor as shown in FIG. 1.
Figure 1:
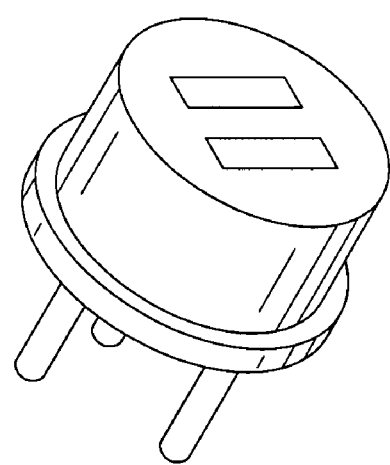
FIG. 1 is a diagram of a conventional dual-element pyroelectric infrared sensor.
Figure 4:
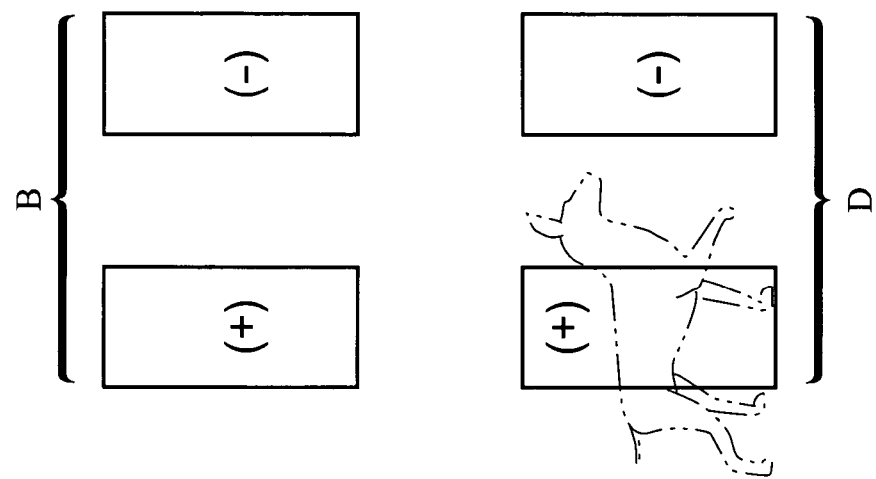
FIG. 4 is a diagram of animal detection utilizing the conventional lens and pyroelectric infrared sensor combination of FIG. 1 and FIG. 2.
Figure 3:
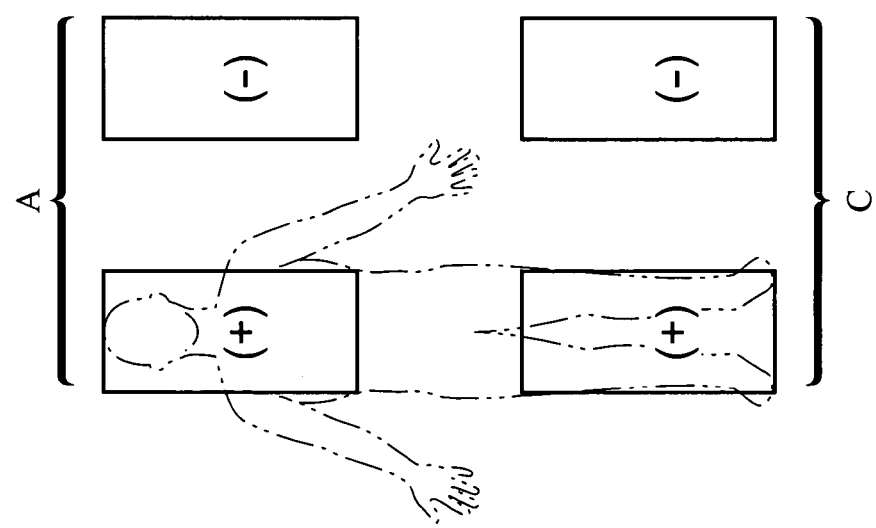
FIG. 3 is a diagram of human detection within zones utilizing a conventional lens and pyroelectric infrared sensor combination of FIG. 1 and FIG. 2.

Referring more specifically to the drawings, for illustrative purposes the present invention is embodied in the apparatus generally shown in FIG. 5 through FIG. 15, as well as the methods described in connection therewith. It will be appreciated that the apparatus may vary as to configuration and as to details of the parts, and that the method may vary as to the specific steps and sequence, without departing from the basic concepts as disclosed herein.

FIG. 5 is a preferred configuration of a dual-channel quad-element infrared sensor 10 shown integrated in a single package 12. This is the preferred configuration having four infrared sensing elements 14a, 14b, 16a, 16b, integrated within a single package. Sensing elements 14a, 14b are preferably coupled in opposing polarity on a first channel, and sensing elements 16a, 16b on a second channel. A detector according to the present invention may be configured using two packaged dual-element pyroelectric infrared sensors. Dual-element pyroelectric infrared sensors are generally configured with two separate pyroelectric infrared sensing elements connected in opposite polarity so that any common mode signals, such as resulting from changing ambient conditions or power-line fluctuations, do not contribute to the generation of an alarm. Each horizontally-oriented dual-element pyroelectric infrared sensor is preferably configured to generate a single signal in response to the infrared intensity, while rejecting common-mode noise.

The infrared sensing element array may be configured as an integrated quad-element pyroelectric infrared sensor, two separate dual-element pyroelectric infrared sensors, or separate pyroelectric infrared sensing elements arranged in a suitable array. It will be appreciated that it is generally beneficial to integrate the pyroelectric infrared sensing elements into a quad-element, or at least two dual-element pyroelectric infrared sensors, to minimize alignment problems and sensor matching issues. It should be appreciated that the inventive technique may be extended beyond the use of a four element (2×2) array.

The use of a quad-element pyroelectric infrared sensor by itself, however, is insufficient in itself to provide proper discrimination of pets from humans. Preferably a single lens assembly (array), and/or reflector, is configured according to the invention which focuses infrared energy from non-overlapping detection zones to the elements of the sensor. Alternatively, other optical arrangements may be utilized which maintain a separation between detection zones. The lens maintains a sufficient amount of separation between the detection zones, wherein the thermal signature from a small animal (pet) would not be simultaneously registered on two vertically adjacent sensing elements. To achieve this separation, the upper lens tier(s) preferably comprise longer focal length lens elements than the lower lens tier(s).

FIG. 6 illustrates an example of a human 18 standing vertically that is detected across two channels of a quad-pyroelectric infrared sensor, sensing element 14b of channel 1 and element 16b of channel 2. When set to a pet-immune mode, the presence of simultaneous infrared activity exceeding a threshold for each channel is interpreted by a threshold circuit, or control device, to generate an alarm. This threshold level can be set within the invention at a reasonable level above the ambient infrared "noise" level for each channel to provide the desired reliability. In addition, the present invention preferably allows weighting of the signals received from the channels. Since the infrared signature for a human is greater at the head than near the feet, a minimum threshold can be set for both channels while at least one channel must exceed a higher threshold. For example a detection zone that contains the intruders head at short range may contain the intruders feet at a longer range.

FIG. 7 illustrates a small animal 20, depicted as a dog, within a detection zone, wherein conditions are not met for infrared activity detected on both channels. The combination of sensor and lens is configured in the present invention so that an animal, such as a large dog, can only fill one detection zone in the vertical direction. As a small animal, such as a dog, can not fill two vertically adjacent detection zones and therefore can not produce simultaneous activity on both channels, the sensor can be set with high sensitivity to maximize intruder detection without making the unit subject to generating false alarms. This is in contrast to prior-art detectors which required a trade-off under pet-immune conditions between generation of pet-induced false alarms and the ability to detect a low heat signature human intruder.

Within the present invention, changes to the sensors or lenses is not required when reconfiguring the unit between a pet-immune mode, and a non-pet-immune mode. A switch or other selector means changeable at the point of installation and/or use, is preferably incorporated which controls whether pet-immune mode is selected. The present invention is preferably implemented to allow switching in or out of a pet-immune mode without the need of any spare parts, without disassembly of the detector unit, and without replacing either sensor or lens assemblies.

Alternatively, the function of the mode setting switch may be replaced by communicating a mode signal to the threshold circuit. The mode signal indicates to the threshold circuit whether to operate in pet-immune, or non-pet-immune detection modes.

Furthermore, a mode setting mechanism need not be incorporated in the present invention if the threshold circuit and alarm interface are configured for generating multiple intrusion signals, or signal states, in response to the type of intrusion detected. By way of example the polarity of the alarm signal can indicate whether animal intrusion or human intrusion has been detected, wherein a remote alarm controller can determine what response to take. In the embodiment shown, the microcontroller can alternate between modes and generate an animal intrusion signal if the infrared activity threshold is crossed on individual detection zones, or generate a human intrusion signal if the infrared activity threshold is crossed for at least one pair of vertically aligned detection zones. In this way, the intrusion system can use information from both pet-immune and non-pet-immune modes to optimize operation, such as at different times of the day.

Figure 8:
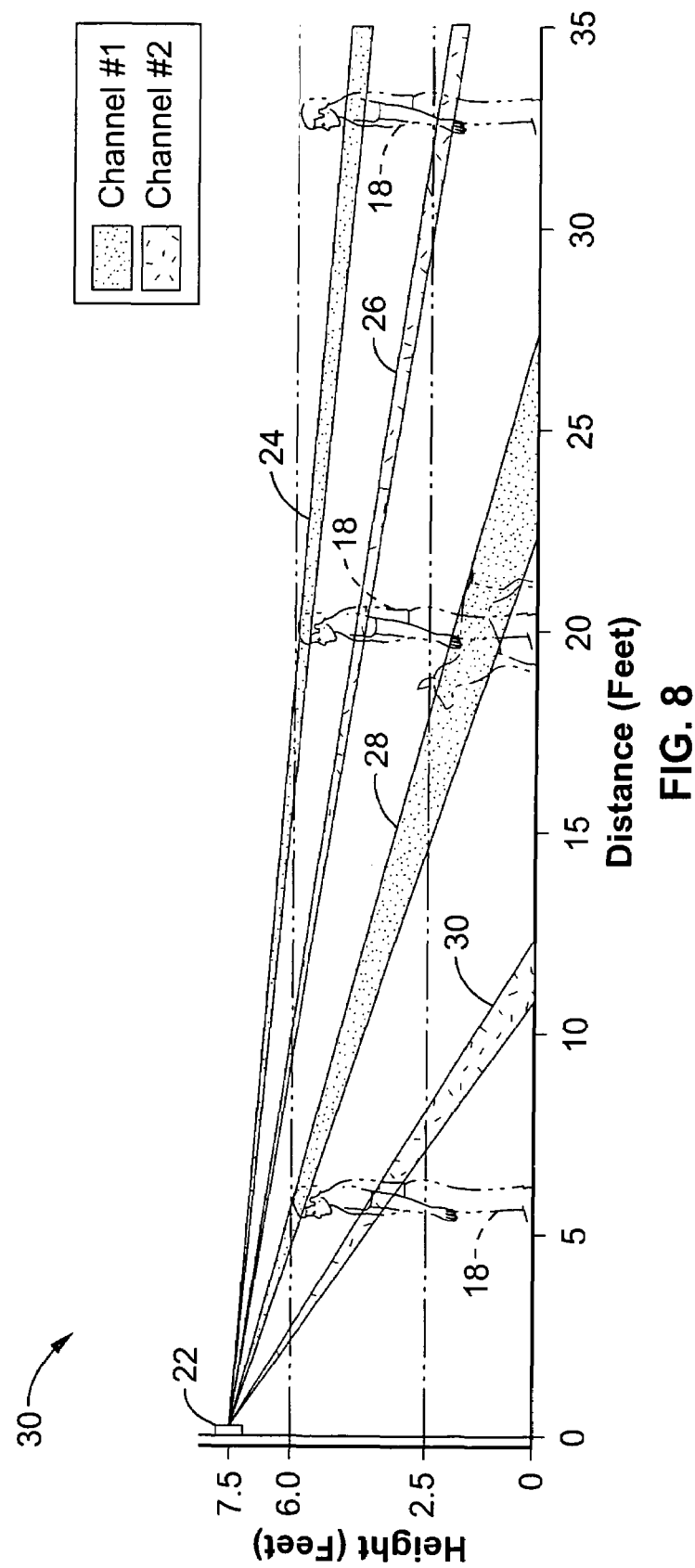
FIG. 8 is a diagram of intrusion zone coverage utilizing a single quad-element pyroelectric infrared sensor and a single two tier lens array according to an aspect of the present invention and showing narrow detection zones in the upper two rows which result from the longer focal lengths on the upper tier of lens elements in a combined pet/human detection situation.
Figure 9:
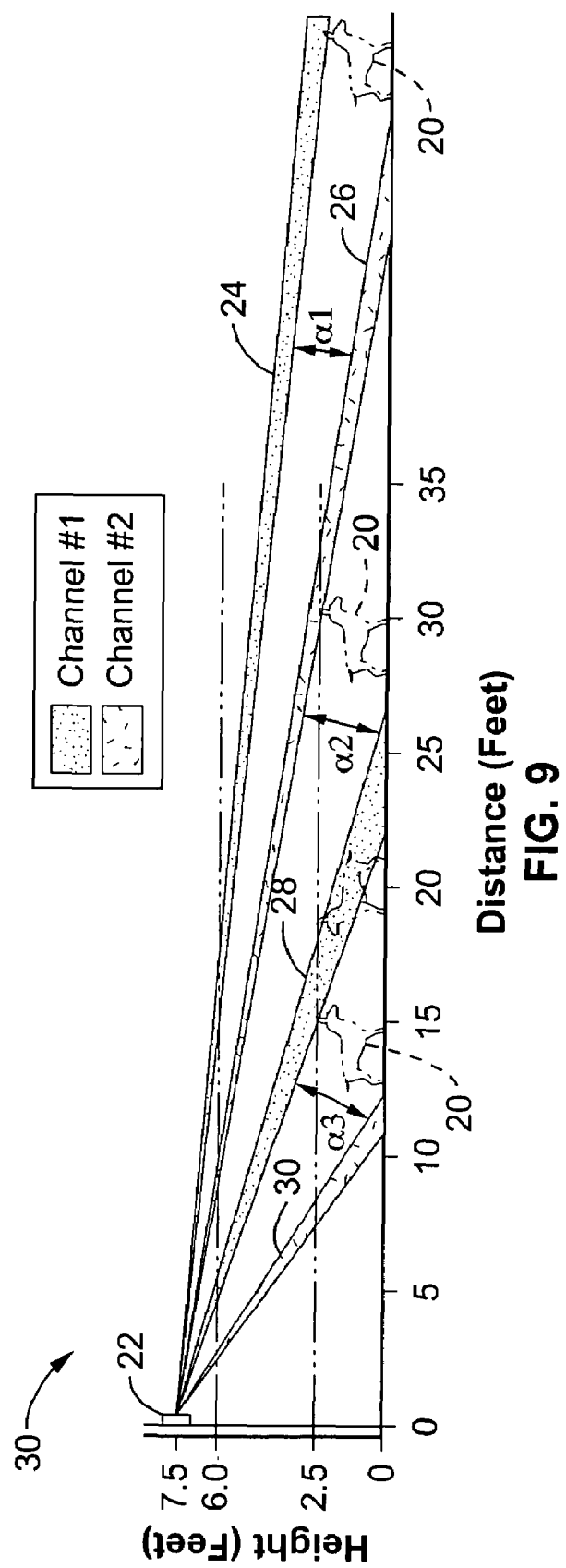
FIG. 9 is a diagram of intrusion zone coverage utilizing a single quad-element pyroelectric infrared sensor and a single lens array according to an aspect of the present invention and showing longer focal lengths on the upper tier of the lens array with a pet at different locations within the detection pattern.

FIG. 8 and FIG. 9 illustrate an example of an intrusion detection system 22 incorporating a quad-element infrared sensor and a two-tier lens array. The figures depict a detailed view of the four rows (tiers) of detection zones 24, 26, 28, and 30 in relation to humans 18 and pets 20 at various points within the protection pattern (approximate 35 foot range in the present example) and beyond.

Each row of the detection pattern preferably comprises a series of non-overlapping detection zones that are horizontally adjacent (although diverging as a function of radial distance) at any given radial distance from the detector. In providing appropriate sizing and spacing of the detection zones, it is preferred that the focal lengths of the lens elements vary in the vertical direction with shorter focal lengths utilized to produce the short range detection zones 28, 30 and longer focal lengths utilized to produce the long range detection zones 24, 26. This arrangement maintains a relatively uniform height for the detection zones at the point where each zone intersects the ground, while allowing the designer to tailor the amount and shape of the non-detection areas between detection zones.

The quad element infrared sensor is configured with the upper pair of sensing elements connected to the first output channel (channel 1) and the lower elements connected to a second channel (channel 2). The lens is configured with the upper tier of lens elements having a focal length approximately three (3) times that of the lower tier. The resulting detection zones formed by the upper lens tier 24, 26 have approximately one-third (⅓) of the size and separation at a given distance than the detection zones formed by the lower lens tiers 28, 30. When the system is configured for pet-immune sensing, simultaneous activity associated with the registered infrared signatures spanning two or more vertical zones will cause simultaneous signals on both channels satisfying the condition for intrusion alarm.

In FIG. 8, the human 18 is shown at three different distances from the detector. At about six (6) feet, the human is shown to be in detection zones 28 and 30. At about twenty (20) feet, the human is shown to be in detection zones 24, 26 and 28. At about thirty three (33) feet, the human is shown to be in detection zones 24 and 26. At each location and any location between, the human produces simultaneous signals on channels 1 and 2, causing an alarm. The dog however is shown to be in detection zone 28 producing a signal on channel 1 only, which is not sufficient to cause an alarm.

In FIG. 9, dog 20 is shown at four different distances from the detector. Three positions are within the approximate thirty five (35) foot detection pattern and one position lies outside the detection pattern. The angles between the vertically adjacent detection zones $\alpha 1$, $\alpha 2$, and $\alpha 3$ are configured to prevent the dog from occupying space in two vertically adjacent zones at the same time. The image of the dog is shown at 14 feet, 29 feet and 50 feet to occupy the space between vertically adjacent detection zones. This illustrates that in the lens configuration of this invention the dog can not be detected in two vertically adjacent zones simultaneously and therefore can not produce simultaneous signals on both channels wherein an intrusion alarm will not be generated. The distance shown in FIG. 9 extends beyond the approximate thirty five (35) foot detection pattern to illustrate that this invention maintains pet immunity at all distances from the detector. Pet immunity is maintained in the present invention, unlike prior art which contains overlapping upper detection zones allowing the dog to occupy space in the top two vertically adjacent zones at long range, producing simultaneous signals on both channels and potentially producing an erroneous intrusion alarm. A method to achieve angles a1, a2, and a3 sufficient to prevent a dog from occupying space in two vertically adjacent zones is identified in the detailed description of FIG. 11.

When intrusion detector 22 is switched into a non-pet-immune mode, wherein it need not discriminate between persons and pets, then intrusion signals may be generated in response to a sufficient signal excursion on any one of the infrared sensing elements. In this "hot" mode of detection, generation of an intrusion signal does not require that a threshold for infrared activity be crossed on two vertically adjacent zones, such as across both sensor channels. Activity on any one channel is sufficient in the non-pet-immune mode for generating an intrusion alert.

Figure 10:
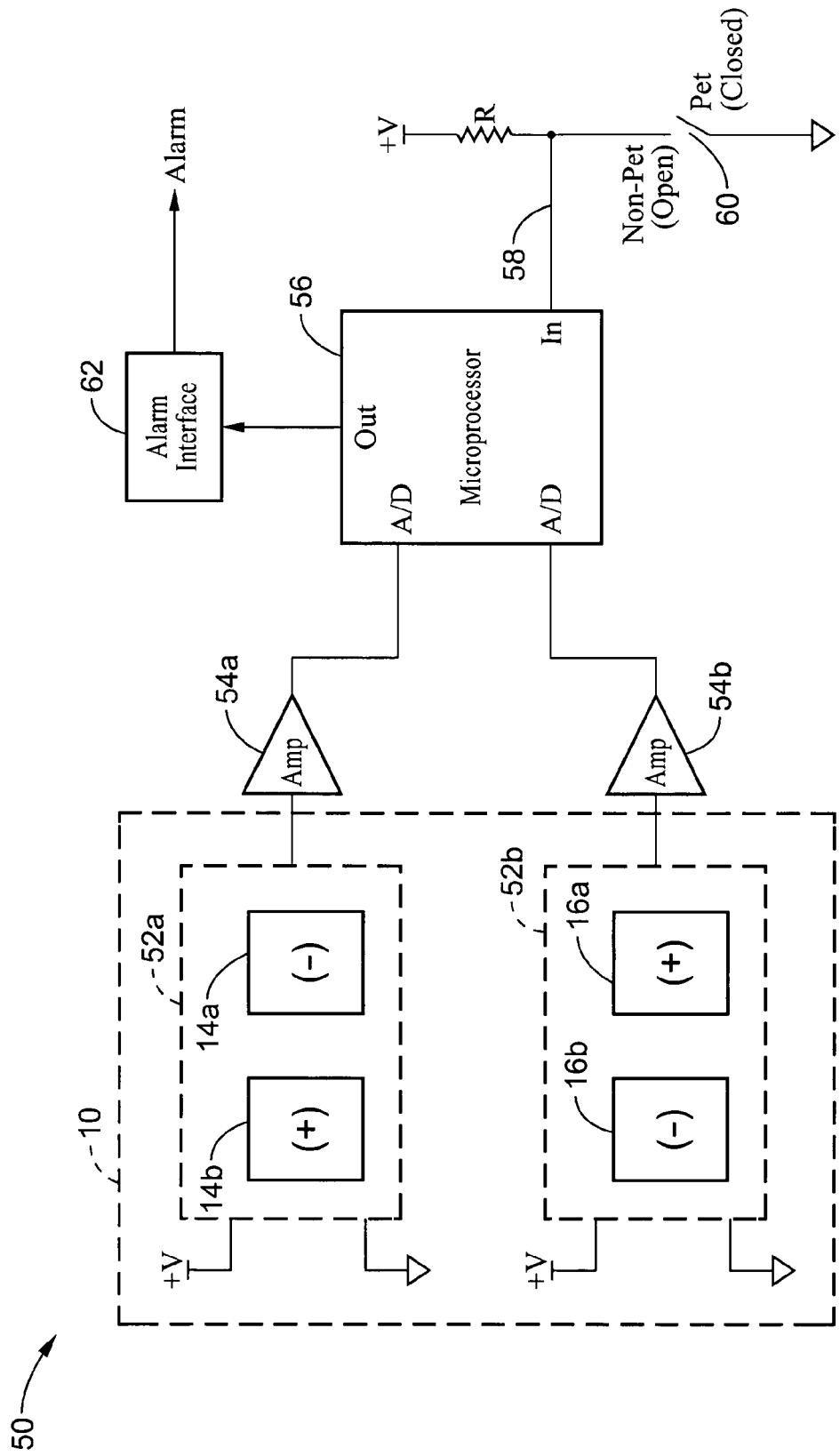
FIG. 10 is a block diagram of an intrusion detection system configured according to an embodiment of the present invention, shown with a microcontroller for registering the sensor outputs and generating a responsive alarm.

FIG. 10 illustrates an example embodiment 50 of the invention implemented microcontroller for performing the threshold detections for two detection channels. Signals from each channel 52a, 52b of the quad-element infrared sensor 10 are conditioned by circuits 54a, 54b prior to being input to an analog-to-digital (A/D) converter exemplified as integrated within a microcontroller 56 (or other programmable processing element). In the pet-immune mode, an intrusion alert is generated when sufficient infrared activity is simultaneously sensed on both sensor channels. In the non-pet-immune mode the intrusion alert is generated in response to a sufficient level of infrared activity on either sensor channel.

It will be appreciated that simple resistor-capacitor (RC) networks on programmable input-output (I/O) pins may be utilized in place of the A/D inputs shown, wherein capacitors are discharged under program control and then the time required to charge the capacitor through the resistance to reach the input pin high threshold is registered and converted to a voltage value. It should also be understood that other alternative forms of registering intensity values from the infrared sensing elements may be utilized without departing from the teachings of the present invention.

Processor 56 evaluates whether an intrusion has occurred in response to the setting of the pet switch 60 whose state is read on input line 58. In response to detected conditions, alarm information is generated to an alarm interface 62 within an alarm system. It should be appreciated that the multiple horizontal bands of detection zones are preferably produced by including multiple lens tiers.

It should be appreciated that four separate pyroelectric infrared sensing elements may be coupled to four inputs on the microcontroller, wherein common-mode rejection across each horizontal row of infrared sensing elements is accomplished within the microcontroller. This embodiment can also utilize signal information from the horizontal rows of sensing elements for enhanced detection, such as generating an intrusion signal in response to detecting infrared activity across multiple sensing elements within a row. The detection being preferably performed only when the signals do not appear to be the result of common mode noise which would appear at least partially on both horizontal pairs of sensing elements.

It should be understood that this pet-immune detector may be implemented utilizing analog circuitry, digital circuitry, or a combination thereof, without departing from the present invention. Signal processing techniques in both analog and digital domains are well known in the art.

Figure 11:
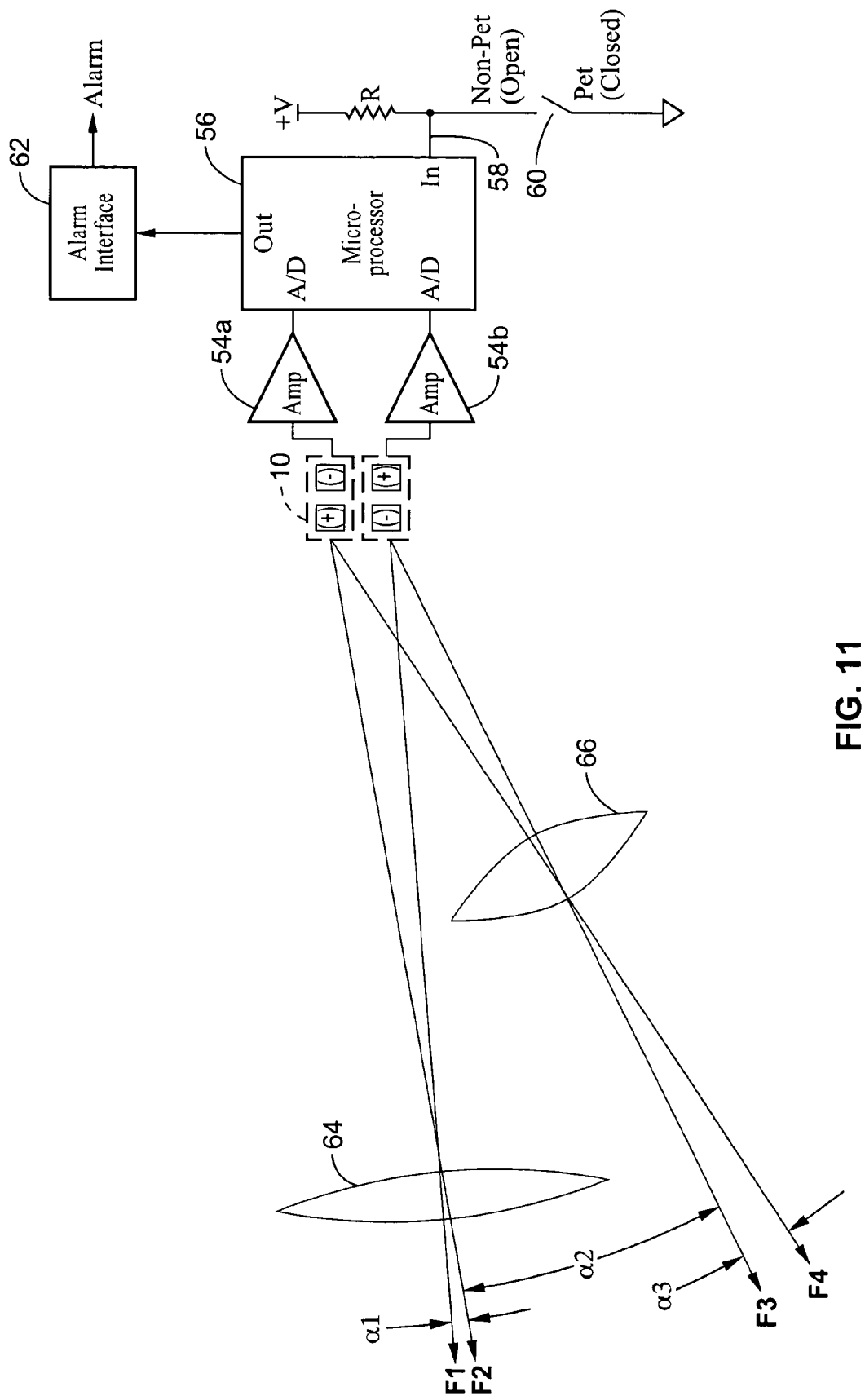
FIG. 11 is a block diagram of the intrusion system of FIG. 10, shown with a long focal length lens element in the upper lens tier and a short focal length lens elements in the lower lens tier.

FIG. 11 illustrates by way of example the alarm circuit of FIG. 10 shown with upper and lower focusing element tiers 64, 66. It should be appreciated that although the focusing elements may be separate as shown in the figure for the sake of clarity, they would preferably be integrated within a multi-element focusing assembly, such as a complex lens, to reduce assembly and alignment overhead. The two rows of focusing elements, such as lenses, provide four rows of detection zones as previously illustrated. For a given quad pyroelectric infrared sensor physical arrangement, the focal length of the upper focusing elements defines the vertical separation angle between the top two rows of detection zones given by vectors F1 and F2 which is α1. The vertical offset between the centerline of the pyroelectric infrared sensor and the centerline of the upper focusing elements defines the downward angle of the upper detection zones. The focal length of the lower focusing elements defines the vertical separation angle between the lower two rows of detection zones F3 and F4 which is α3. The vertical separation between the upper and lower rows of focusing elements defines vertical separation angle between the middle rows of detection zones F2 and F3 which is α2. It should be noted that vectors F1, F2, F3, F4 shown in FIG. 11 typically correspond to detection zones 24, 26, 28, 30 of FIG. 8 and FIG. 9. It will be appreciated from the figure that long focal length elements produce smaller angles between the detection zones produced by the sensing elements of each sensor channel as illustrated by angle α1, while short focal length elements produce larger angles between the detection zones illustrated by angle α3. The angle α2 between vectors F2 and F3 is a function of the angle formed by the vectors from the pyroelectric infrared sensing elements through the optical centers of each lens tier. The object is to define a quad-element pyroelectric infrared sensor that has element sizing and vertical spacing between channels that when combined with a specific longer focal length lens element of the upper tier, a specific shorter focal length of the lower tier, and a non-overlapping angular spacing between upper and lower tiers discriminates pet motion from human motion.

Figure 12:
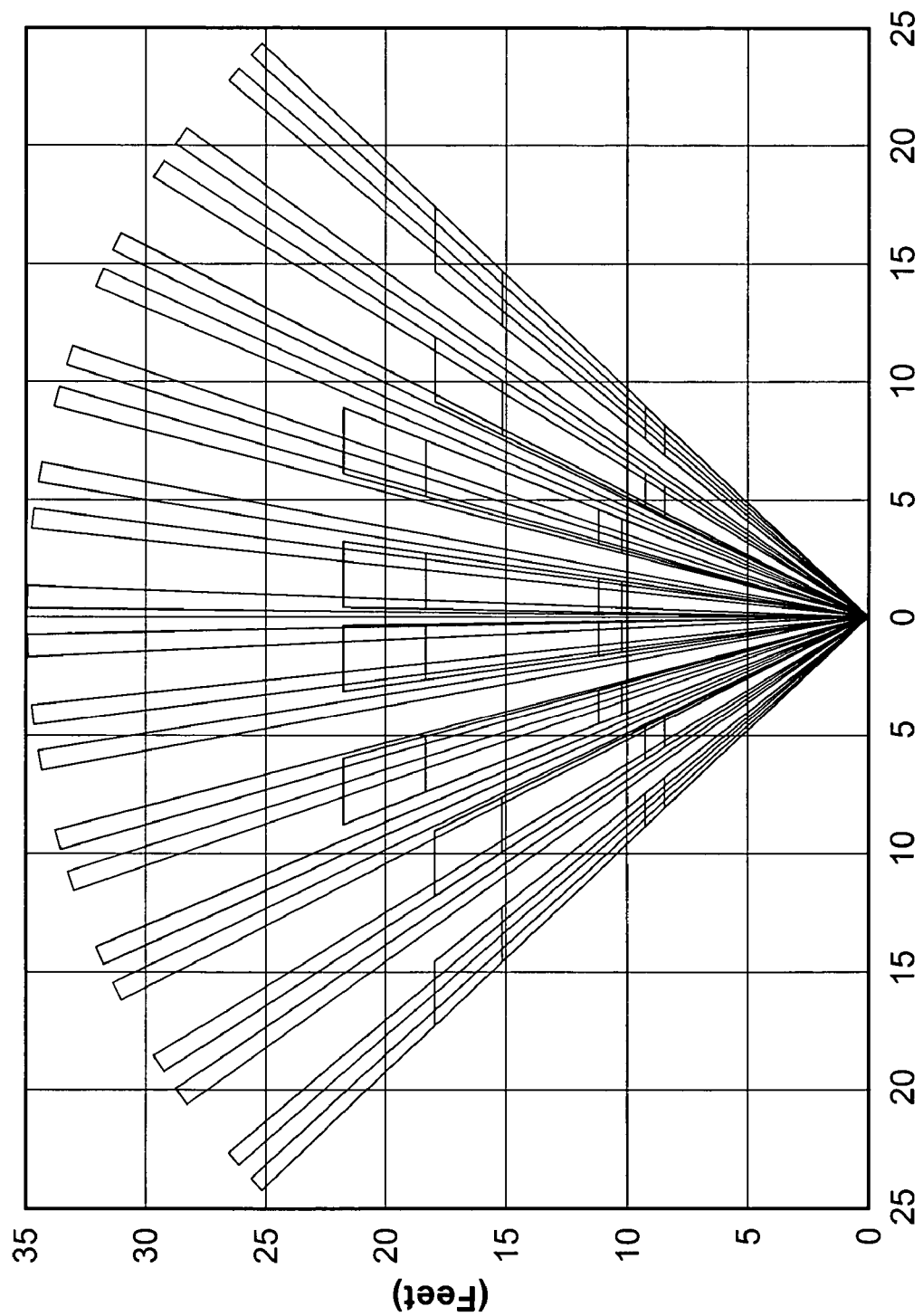
FIG. 12 is a diagram of a detection pattern according to an aspect of the present invention, showing all detection zones in a detection pattern.
Figure 13:
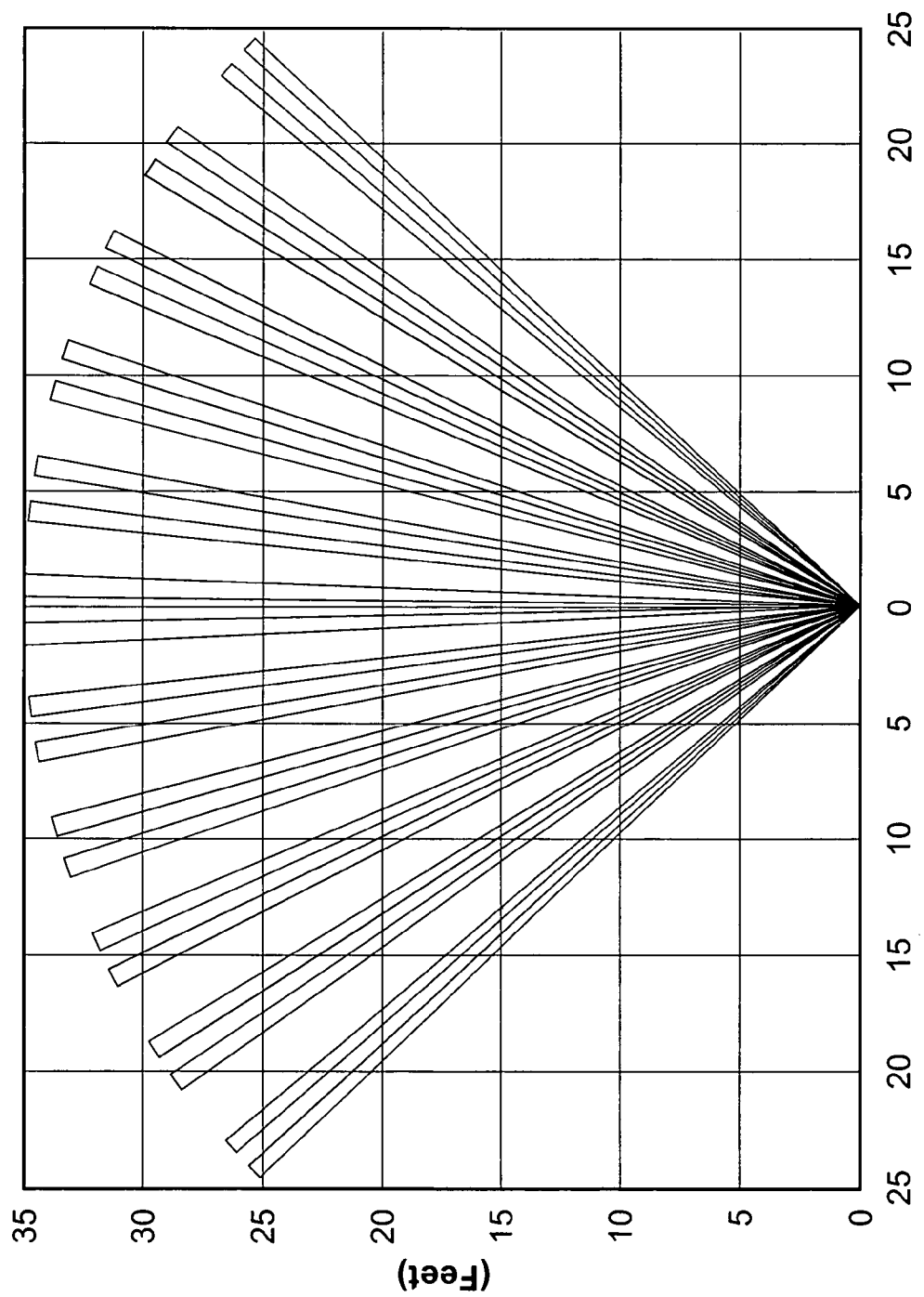
FIG. 13 is a diagram of a detection pattern according to an aspect of the present invention, showing the detection zones in row 1 or row 2 (top rows) of the detection pattern.
Figure 14:
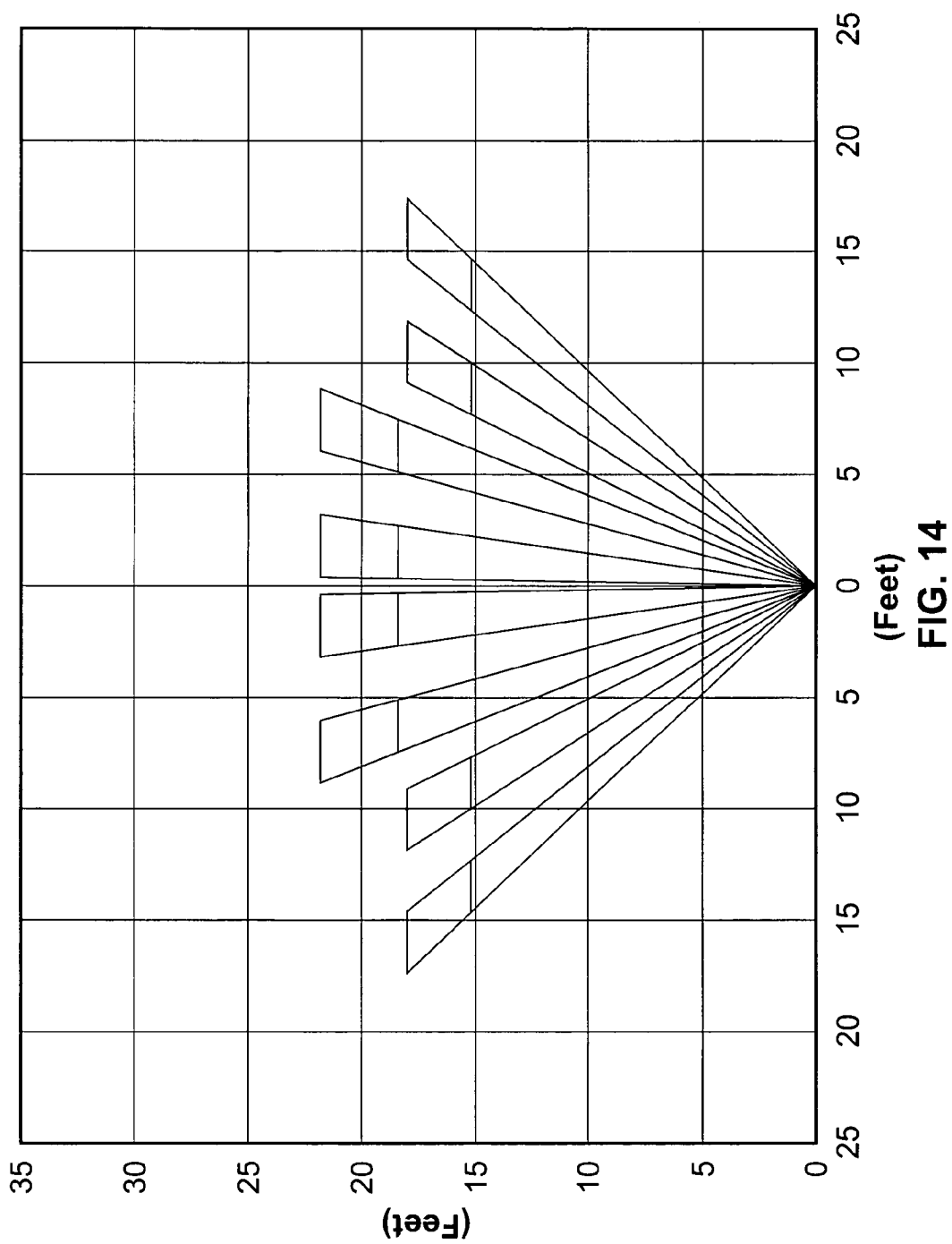
FIG. 14 is a diagram of a detection pattern according to an aspect of the present invention, showing the detections zones in row 3 of the detection pattern.
Figure 15:
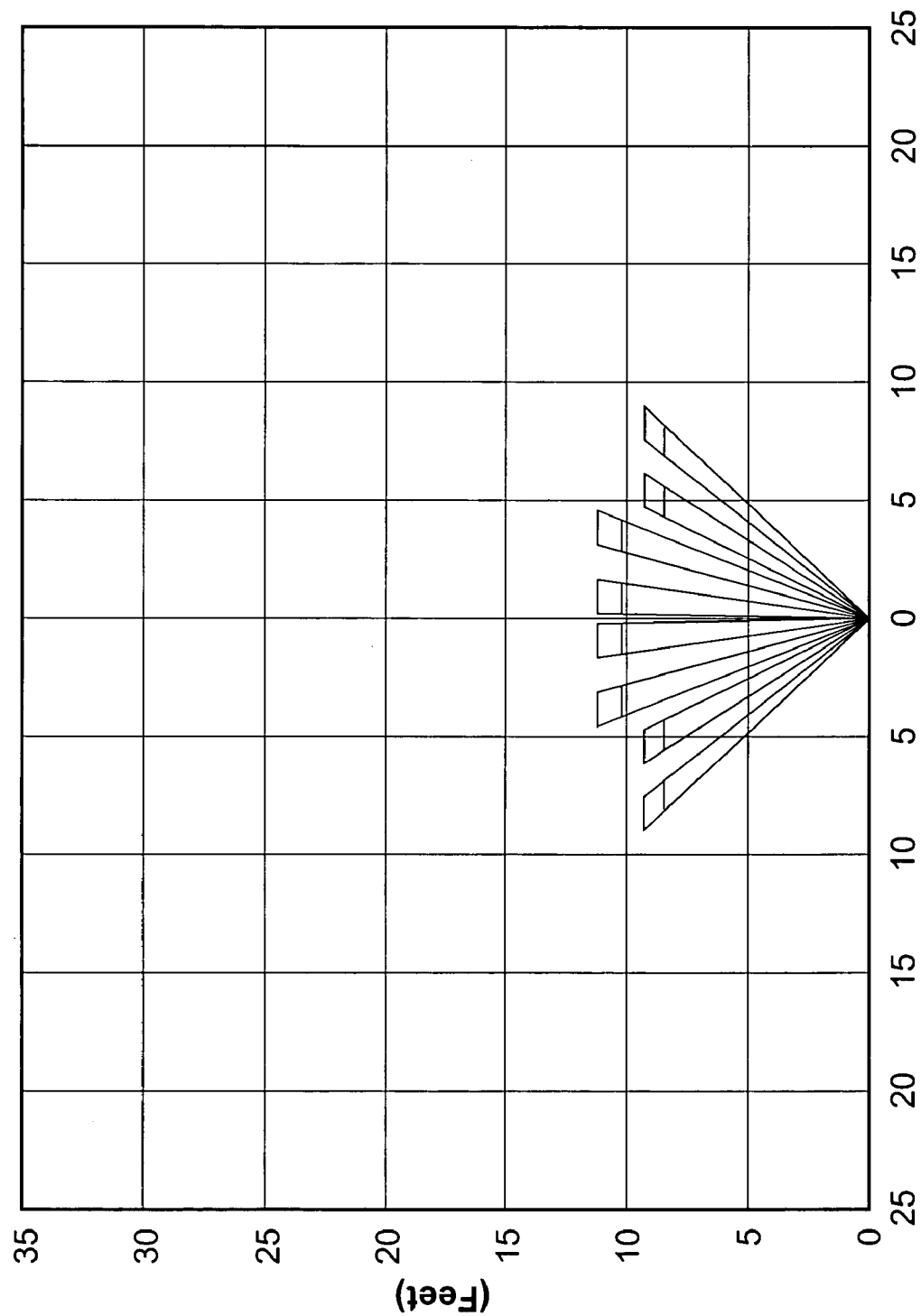
FIG. 15 is a diagram of a detection pattern according to an aspect of the present invention, showing the detection zones in row 4 of the detection pattern.

FIG. 12 through FIG. 15 depict detection patterns according to the present invention. It should be noted that the extended detection zones are generally in (+) and (−) pairs. FIG. 12 depicts all the detection zones within an embodiment of a detection pattern according to the invention. The lens array which generated the detection pattern illustrated in the figures consists of an upper tier containing eleven 35 mm focal length elements and a lower tier containing four 8 mm focal length elements. The embodiment is shown generating a standard 90° pattern. FIG. 13 illustrates the top tier of the detection pattern comprising row 1 and row 2. FIG. 14 illustrates row 3 of the lower tier, while FIG. 15 illustrates row 4 of the lower tier. It should be appreciated that a number of alternative patterns can be created according to the teachings of the present invention.

Accordingly, the present invention provides a method and system for discerning between small animals, such as pets, and humans within an intrusion detection system. By utilizing the teaching of the present invention, the motion of pets can be selectively ignored without comprising the sensitivity of human intrusion detection. An embodiment of the invention has been described with a quad element pyroelectric infrared sensor coupled to a microprocessor unit which is configured to operate in response to a pet-immune selection input, such as depicted by a switch, and to detect intrusions in response to the signals received from the sensor. It should be recognized that the detection processing circuitry of the invention may be implemented in different forms including microprocessors, microcontrollers, digital signal processing devices, sequential logic circuitry, other forms of digital circuits, analog circuits, custom and semi-custom ASICs, and combinations thereof without departing from the teachings of the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for detecting intrusions within a protected region, comprising:

an infrared sensor assembly configured for generating at least two electrical signals in response to activity registered by two vertically adjacent infrared sensing elements within a group of at least four infrared sensing elements;

means for focusing infrared energy from a protected region upon said at least four infrared sensing elements; and means for generating an intrusion signal in response to said at least two electrical signals responsive to the registration of sufficient infrared activity within said protected region on multiple vertically arranged said infrared sensing elements.

2. An apparatus as recited in claim 1, wherein said means for focusing said infrared energy operates by altering the infrared energy direction by refraction, reflection or diffraction.

3. An apparatus as recited in claim 2, wherein said means for focusing said infrared energy comprises an array of optical elements for focusing said infrared energy.

4. An apparatus as recited in claim 3, wherein said array of optical elements are fabricated within a single optical assembly.

5. An apparatus as recited in claim 2, wherein said means for focusing infrared energy comprises a lens assembly.

6. An apparatus as recited in claim 2, wherein said means for focusing infrared energy comprises a mirror assembly.

7. An apparatus as recited in claim 1:
wherein the protection pattern within said protected region comprises non-overlapping upper and lower detection tiers;
wherein said infrared sensing elements are arranged as an upper tier and a lower tier;
wherein said means for focusing infrared energy is configured for focusing infrared energy from an upper tier of detection zones within said detection pattern to one tier of said infrared sensing elements and infrared energy from a lower tier of detection zones within said detection pattern to another tier of said infrared sensing elements.

8. An apparatus as recited in claim 7:
wherein said means for focusing infrared energy is configured with a longer focal length upper tier for focusing infrared energy to said sensing elements, and a shorter focal length lower tier for focusing infrared energy to said sensing elements;
wherein altering the focal lengths in said upper and lower tiers allows configuring desired levels of vertical separation between detection tiers within said detection pattern.

9. An apparatus as recited in claim 7, wherein said means for generating an intrusion signal is configured to detect levels of infrared energy on a vertically-oriented pair of sensing elements to discern animal intrusions registered upon any single sensing elements, from human intrusions which are registered as sufficient simultaneous activity on two vertically separated sensing elements.

10. An apparatus as recited in claim 9, wherein said means for generating an intrusion signal comprises a threshold circuit configured to receive electrical signals from said infrared sensing elements and to generate an intrusion alert upon registering a sufficient infrared activity level on said two vertically separated sensing elements.

11. An apparatus as recited in claim 9, further comprising a mode selection device coupled to said means for generating an intrusion signal for the selection of either a pet-immune mode or a non-pet-immune mode.

12. An apparatus as recited in claim 11:
wherein said means for focusing infrared energy operates to focus infrared energy from horizontally arranged detection zones within a non-overlapping upper and lower detection tier to an upper and lower pair of said infrared sensing elements;
wherein said means for generating an intrusion signal generates intrusion signals in response to registering a sufficient level of infrared activity on both said upper and lower detection tier within one or more vertically aligned detection zones when said pet-immune mode is selected;
wherein said means for generating an intrusion signal generates intrusion signals in response to registering a sufficient level of infrared activity on any of said detection zones within either of said upper or lower detection tier when said non-pet-immune mode is selected.

13. An apparatus as recited in claim 1, wherein said infrared sensing elements comprise at least a first infrared sensor channel connecting two horizontally-oriented infrared sensing elements in opposing polarity, and a second infrared sensor channel connecting two additional horizontally-oriented infrared sensing elements in opposing polarity.

14. An apparatus as recited in claim 1, wherein said infrared sensor assembly is packaged as two dual-sensing element device packages.

15. An apparatus as recited in claim 1, wherein said infrared sensor assembly is packaged in a single quad-sensing element device package.

16. An apparatus as recited in claim 1, wherein the centers of said infrared sensing elements are positioned within one half inch of one another.

17. An apparatus as recited in claim 1, wherein said infrared sensing elements comprise infrared sensors.

18. An apparatus as recited in claim 17, wherein said infrared sensors comprise pyroelectric infrared sensors.

19. An apparatus as recited in claim 1:
wherein said infrared sensing elements are configured in upper and lower horizontally-oriented pairs;
wherein said infrared sensing elements of each said horizontally-oriented pair are connected in opposing polarity;
wherein common-mode infrared energy simultaneous registered on each said sensing element of said horizontally-oriented pair of said infrared sensing elements is thereby rejected as common-mode noise.

20. An apparatus for detecting intrusions, comprising:
an infrared sensor assembly having at least four infrared sensing elements;
a lens assembly configured to focus infrared energy from non-overlapping upper and lower tiers of detection zones upon upper and lower pairs of said infrared sensing elements; and
a threshold circuit configured to generate an intrusion signal in response to receipt of a sufficient level of simultaneous infrared activity on vertically separated detection zones within said upper and lower tiers of detection zones.

21. An apparatus as recited in claim 20:
wherein vertical angular separation between detection zone tiers increases with increasing tier offset from the horizontal to the vertical;
wherein said lens assembly is configured having a longer focal length for focusing energy from the two upper tiers of detection zones to said sensing elements, and a shorter focal length for focusing infrared energy from said two lower tiers of detection zones to said sensing elements;

wherein altering the focal lengths in said upper and lower tiers allows configuring desired levels of vertical separation between detection zones within the detection tiers.

22. An apparatus as recited in claim 21:
wherein said threshold circuit is configured in a pet-immune mode to generate said intrusion signal in response to infrared activity occurring on both upper and lower rows of sensing elements; and
wherein said threshold circuit is configured in a non-pet-immune mode to generate said intrusion signal in response to infrared activity occurring on either upper or lower rows of sensing elements.

23. An apparatus as recited in claim 20, wherein the combination of said infrared sensing elements and said threshold circuit are configured for rejecting common mode infrared signals simultaneously received across horizontally-oriented sensing elements which increases immunity to false alarms.

24. An apparatus as recited in claim 23, wherein said horizontally adjacent sensing elements are connected in opposing polarity so that common mode signals are attenuated to reduce ambient and power-line noise contributions.

25. An apparatus as recited in claim 20, wherein said infrarted sensor assembly comprises pyroelectric infrared sensors.

26. An apparatus as recited in claim 20:
further comprising a mode selector for said threshold circuit which is configured to allow selecting either a pet-immune mode or a non-pet-immune mode;
wherein for said pet-immune mode intrusion signals are generated in response to sufficient levels of infrared activity being registered on a vertically-oriented pair of said infrared sensing elements;
wherein for said non-pet-immune mode intrusion signals are generated in response to sufficient levels of infrared activity being registered on any of said infrared sensing elements.

27. An apparatus as recited in claim 20, wherein said infrared sensor assembly comprises at least a first sensor channel connecting two adjacent horizontal infrared sensing elements in opposing polarity, and a second sensor channel connecting two additional adjacent horizontal infrared sensing elements in opposing polarity.

28. An apparatus as recited in claim 27, wherein said first sensor channel is positioned over said second sensor channel with alternating polarities in the vertical direction.

29. An apparatus as recited in claim 20, wherein said infrared sensing elements are packaged as two dual-sensing element device packages.

30. An apparatus as recited in claim 20, wherein said infrared sensing elements are packaged in a single quad-sensing element device package.

31. An apparatus as recited in claim 20, wherein said infrared sensing element comprise pyroelectric infrared sensors.

32. An apparatus as recited in claim 20, wherein said lens assembly is configured with multiple lens elements to register infrared energy within multiple horizontal bands of detection zones arranged vertically.

33. An apparatus as recited in claim 32, wherein said lens assembly comprises two or more horizontally oriented tiers of lenses for focusing infrared energy to said infrared sensing elements from at least one non-overlapping pair of detection zone tiers.

34. An apparatus as recited in claim 32, wherein said lens assembly comprises at least four horizontally oriented tiers of lenses for focusing infrared energy to said infrared sensing elements from multiple pairs of non-overlapping detection zone tiers.

35. An apparatus as recited in claim 32, wherein said lens assembly comprises adjacent horizontal lenses which focus infrared energy from detection zones within the protected region of the apparatus.

36. An apparatus as recited in claim 20, wherein said threshold circuit comprises a microprocessor coupled to said infrared sensors and configured for receiving signals from said infrared sensor assembly in response to infrared intensity.

37. An apparatus as recited in claim 20, wherein the mechanical configuration of lenses and/or infrared sensors need not be altered to switch operating modes between a pet-immune mode, and a non-pet-immune mode.

38. An apparatus for detecting intrusions, comprising:
an infrared sensor assembly having at least four infrared sensing elements arranged in at least two horizontally-oriented sensor tiers;
a lens assembly configured to focus infrared energy from non-overlapping upper and lower tiers of detection zones to said sensor tiers; and
a threshold circuit coupled to said sensor tiers and configured to generate an intrusion signal in response to infrared activity; and
a mode selector input coupled to said threshold circuit for selecting either a pet-immune operating mode or a non-pet-immune operating mode;
wherein said threshold circuit operates within said pet-immune mode by generating intrusion signals in response to a sufficient level of infrared activity registered on at least two tiers of detection zones which are vertically adjacent to one another;
wherein threshold circuit operates within said non-pet-immune mode by generating intrusion signals in response to a sufficient level of infrared activity registered on any of said infrared sensing elements.

39. An apparatus as recited in claim 38:
wherein said lens assembly is configured having a longer focal length for focusing infrared energy from the two upper tiers of detection zones to said sensing elements, and a shorter focal length for focusing infrared energy from said two lower tiers of detection zones to said sensing elements;
wherein altering the focal lengths in said upper and lower tiers allows configuring desired levels of vertical separation between detection zones within the detection tiers.

40. A method of discriminating human intrusion from animal intrusion within an infrared detection area, comprising:
registering infrared intensity within the infrared detection area as received from at least two stacked non-overlapping detection tiers each having a plurality of non-overlapping detection zones;
rejecting common infrared signals simultaneously occurring on horizontally adjacent detection zones within a given said detection tier; and
generating an intrusion signal indicative of the presence of human intruders in response to registering sufficient simultaneous infrared activity on vertically adjacent detection zones in at least two of said stacked detection tiers.

41. A method as recited in claim 40, further comprising generating an intrusion signal indicative of intruders having a heat signature shorter than a standing human, said intrusion signal generated in response to registering sufficient infrared activity on any of said detection zones of said stacked detection tiers.

42. A method as recited in claim 40, further comprising a mode selector input configured for determining whether an intrusion signal should be generated in response to sufficient infrared activity on any of said detection zones within a non-pet-immune mode, or requiring sufficient infrared activity on vertically adjacent detection zones within a pet-immune mode.

43. A method as recited in claim 40, wherein infrared sensors comprise pyroelectric infrared sensors.

44. A method as recited in claim 40, wherein said stacked non-overlapping detection tiers are configured with sufficient vertical separation so that a standing, or semi-standing human, will be simultaneously registered in at least two vertically adjacent detection zones.

45. A method as recited in claim 40:
further comprising focusing infrared energy with a long focal distance for detection tiers having long detection zones and a shorter focal distance for detection tiers having shorter detection zones;
wherein altering the focal lengths in said tiers allows configuring desired levels of vertical separation between vertically adjacent detection zones of said detection tiers.

* * * * *